United States Patent
Shi et al.

(10) Patent No.: US 7,804,820 B2
(45) Date of Patent: Sep. 28, 2010

(54) SYSTEM AND METHOD FOR PROCESSING PACKET DOMAIN SIGNAL

(75) Inventors: Youzhu Shi, Guangdong (CN); Dongming Zhu, Guangdong (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 697 days.

(21) Appl. No.: 11/682,392

(22) Filed: Mar. 6, 2007

(65) Prior Publication Data

US 2007/0211695 A1     Sep. 13, 2007

Related U.S. Application Data

(63) Continuation of application No. PCT/CN2005/000734, filed on May 26, 2005.

(30) Foreign Application Priority Data

Sep. 7, 2004   (CN) .................. 2004 1 0079901

(51) Int. Cl.
*H04L 12/66* (2006.01)
*H04M 3/42* (2006.01)
*G06F 15/16* (2006.01)

(52) U.S. Cl. .................. 370/353; 370/352; 370/356; 370/373; 370/385; 379/221.14; 379/221.09; 709/227

(58) Field of Classification Search ......... 370/328–503; 709/227; 379/221.08–221.14
See application file for complete search history.

(56) References Cited

U.S. PATENT DOCUMENTS

| | | | | |
|---|---|---|---|---|
| 6,871,070 B2 * | 3/2005 | Ejzak | ...................... | 455/435.1 |
| 6,954,654 B2 * | 10/2005 | Ejzak | ...................... | 455/560 |
| 7,002,970 B1 * | 2/2006 | Veschi | ...................... | 370/401 |
| 7,145,994 B2 * | 12/2006 | Moreau et al. | ...................... | 379/114.01 |

(Continued)

FOREIGN PATENT DOCUMENTS

CN         146905 A         1/2004

(Continued)

OTHER PUBLICATIONS

English Translation of Writen Opinion of the International Searching Authority, International application No. PCT/CN2005/000734, date of mailing Sep. 8, 2005, 4 pages.

(Continued)

*Primary Examiner*—Venkatesh Haliyur
(74) *Attorney, Agent, or Firm*—Slater & Matsil, L.L.P.

(57) ABSTRACT

Embodiments of the present invention disclose a system and a method for processing a packet domain service signal, which enable a terminal that does not support an access control protocol of an Internet Protocol Multimedia Subsystem (IMS) to access the IMS and acquire the services in the IMS. An AGCF is added for shielding the differences of the users on the basis of the IMS defined in the 3GPP R5/R6 standard, specifically, a PSTN/ISDN user accesses an AGF first, accesses the IMS through an agent function of the AGCF, and the AGCF also manages and controls the AGF. Control of the PSTN/ISDN services may be implemented in the AGCF, or in an AS added to the IMS, or the control of basic services and supplementary services may be implemented in the AGCF while the control of value-added services may be implemented in the AS.

1 Claim, 4 Drawing Sheets

U.S. PATENT DOCUMENTS

| | | | |
|---|---|---|---|
| 7,260,384 B2 * | 8/2007 | Bales et al. | 455/413 |
| 7,330,542 B2 * | 2/2008 | Kauhanen et al. | 379/229 |
| 7,400,881 B2 * | 7/2008 | Kallio | 455/412.2 |
| 7,406,330 B2 * | 7/2008 | McConnell et al. | 455/554.1 |
| 7,489,634 B2 * | 2/2009 | Sanchez Cembellin et al. | 370/231 |
| 7,551,734 B2 * | 6/2009 | Rasanen et al. | 379/221.14 |
| 7,596,102 B2 * | 9/2009 | Forbes et al. | 370/260 |
| 7,643,474 B2 * | 1/2010 | Huang | 370/352 |
| 7,660,898 B2 * | 2/2010 | Mueller et al. | 709/227 |
| 7,746,849 B2 * | 6/2010 | Bodin et al. | 370/355 |
| 7,751,415 B2 * | 7/2010 | Bos et al. | 370/410 |
| 2002/0024943 A1 | 2/2002 | Karaul et al. | |
| 2003/0233457 A1 * | 12/2003 | Basilier et al. | 709/227 |
| 2004/0008669 A1 | 1/2004 | Bos et al. | |
| 2004/0037273 A1 * | 2/2004 | Lobig | 370/356 |
| 2005/0286703 A1 * | 12/2005 | Munch | 379/211.02 |
| 2008/0002669 A1 * | 1/2008 | O'Brien et al. | 370/352 |
| 2008/0049648 A1 * | 2/2008 | Liu et al. | 370/310 |
| 2008/0052769 A1 * | 2/2008 | Leone et al. | 726/7 |

FOREIGN PATENT DOCUMENTS

| | | |
|---|---|---|
| CN | 1467978 A | 1/2004 |
| EP | 1 370 056 A1 | 12/2003 |
| KR | 2002043434 A | 6/2002 |
| WO | WO03036905 A1 | 5/2003 |

OTHER PUBLICATIONS

3GPP TS 23.002 V6.5.0 (Jun. 2004), "3$^{rd}$ Generation Partnership Project; Technical Specification Group Services and Systems Aspects; Network architecture (Release 6)," Jun. 2004, 57 pages.

* cited by examiner

SYSTEM AND METHOD FOR PROCESSING PACKET DOMAIN SIGNAL

FIELD OF THE TECHNOLOGY

The present invention relates to the telecommunication service network technology based on wideband packet transmission, and especially, to a system and a method for processing a packet domain signal.

BACKGROUND OF THE INVENTION

The Integrated Services Digital Network (ISDN) originated in 1967 is a communication network developed on the basis of the Integrated Digital Network (IDN). The ISDN supports end-to-end digital connections and various communication services, such as a telephone service, and provides standard user-network interfaces to be accessed by various terminals.

The Public Switched Telephone Network (PSTN), as a public communication network, provides voice and data communication services which are based on switched lines.

The PSTN/ISDN services generally refer to various services provided to users in the conventional PSTN/ISDN networks.

Conventionally, the PSTN/ISDN services are implemented in a circuit switched domain. With the fast development of the packet-based communication technologies, at present, the PSTN/ISDN services may also be implemented in a packet domain through the softswitch of a Next Generation Network (NGN).

There is a broad sense NGN and a narrow sense NGN.

The broad sense NGN generally refers to all the softswitch architectures in which bearer is separated from control, and the telecommunication service networks using broadband packets as bearer whether the network provides fixed services or mobile services to the users. The telecommunication service networks using broadband packets as bearer may be Internet Protocol (IP) networks or Asynchronous Transfer Mode (ATM) networks. Referring to the following definition of NGN given in the Telecommunication Standardization Sector of International Telecommunication Union (ITU-T) in February 2004, an NGN is a packet-based network, provides multiple services including the telecommunication service, and is capable of using multiple bandwidths and transmission techniques of abilities of Quality of Service (QoS) to implement separation of service functions from bottom-layer transmission techniques; the NGN allows an access of users to networks of different service providers and supports general mobility, which realizes consistent and continuous provision of services to users.

The narrow sense NGN refers to networks based on broadband packet bearer, providing C4/C5 services and IP multimedia services to the users accessing fixed networks. In embodiments of the present invention, the NGN refers to a "narrow sense NGN" unless otherwise mentioned.

In a fixed NGN, the softswitch serves as a call processing node in the network, implementing the PSTN/ISDN services. A PSTN user or an ISDN user accesses the softswitch through access devices, such as an Audio Gateway (AG) and an Integrated Access Device (IAD), the softswitch implements the session control, the service control, and the functions of storing and managing user data, and thus the PSTN/ISDN services are provided to the PSTN user or the ISDN user.

In a technical solution implemented through the softswitch, the functions of call control and service control are coupled to one network node and implemented in the network node, which results in poor flexibility and is unfavourable to fast deployment and extension of services.

Furthermore, modification of a function may bring about changes of other functions, increasing the potential risk. And deployment and extension of some services will even lead to the upgrading of the whole network node, resulting in a high cost. The softswitch can be accessed by fixed terminals through various access devices, such as access devices based on different protocols including the AG and the IAD, and the implementation of the PSTN/ISDN services is related to the access of the users.

Besides the implementation of the PSTN/ISDN services, the softswitch also needs to provide the Service Switch Point (SSP) function to trigger an intelligent service. And the PSTN/ISDN services and the intelligent service conflict with each other because there is no unified trigger mechanism.

The PSTN/ISDN services are distributed and implemented in call processing nodes in the NGN, thus the call processing nodes may not cooperate with each other to implement the PSTN/ISDN services. And there is no definite service arbitrating point when a service conflict occurs.

Since the PSTN/ISDN services are distributed and implemented in the call processing nodes in the NGN, each service needs to be implemented repeatedly in all the softswitches in the network when a unified service brand is popularized, leading to the high cost of service popularization.

The PSTN/ISDN services are distributed and implemented in the call processing nodes in the NGN, it is difficult for the PSTN/ISDN services to function as a basic network service ability, i.e., as a shared network component, to cooperate with other services in the NGN to provide combined value-added services.

The user data are distributed in the call processing nodes in the NGN and the users could only acquire services at access points of the users, thus it is difficult to acquire the same services as previous services if the terminals of the users are allowed to move, and the popularization of the unified service brand is also limited.

The call processing nodes in the NGN may not share the user data of the users accessing the NGN owing to the distribution of the user data, and it is thus difficult to provide a cross call processing node service (a wide area service).

There is also a system with the function similar to that of the fixed NGN above in a Third Generation (3G) mobile telecommunication network, which is an Internet Protocol Multimedia Subsystem (IMS).

Figure 1:
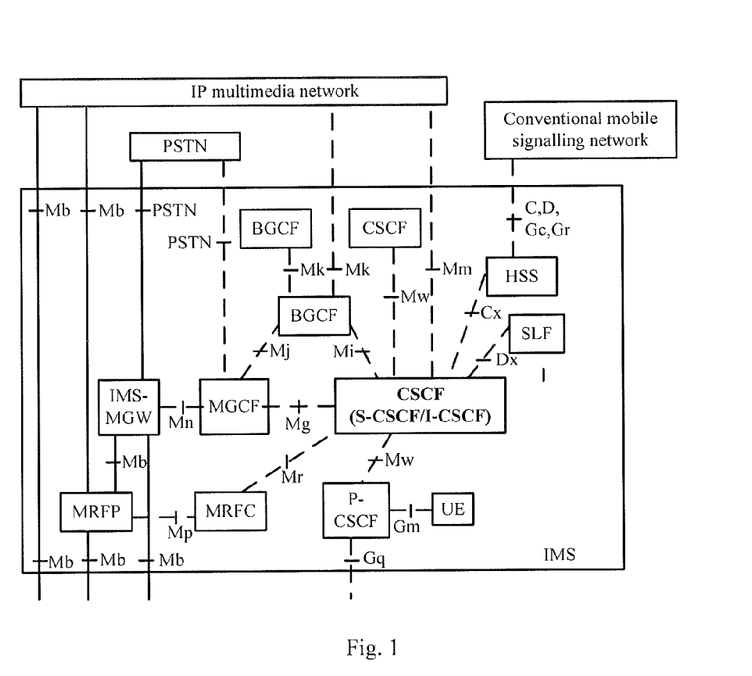
FIG. 1 shows a schematic diagram illustrating the network architecture of the IMS in the 3GPP R5/R6 standard.

The IMS is an IP multimedia subsystem in a Wideband Code Division Multiple Access (WCDMA) network defined in the 3rd Generation Partnership Project (3GPP) R5/R6 standard and is a target network in the 3G mobile telecommunication network for implementing packet voice and packet data and providing unified multimedia services and applications. The IMS uses an IP packet domain as its bearer channel of signalling control and media transmission, uses the (SIP) as signalling of the call control, and achieves separation of service management, session control and bearer accessing. FIG. 1 shows network architecture of the IMS in the 3GPP R5/R6 standard. Refer to "3GPP TS 23.002" for detailed descriptions of each network entity and related interfaces in the IMS.

Although the IMS provides a mechanism for separation of the service management, the session control and the bearer accessing, a PSTN user and an ISDN user may not access the IMS through a visited domain node defined by the IMS standard because the IMS standard is put forward initially for a 3G mobile system, requires the terminal to support an access control protocol of the IMS (typically the SIP) and does not support the access management of the PSTN user and the ISDN user.

SUMMARY OF THE INVENTION

Embodiments of the present invention provide a system for processing a packet domain service signal and a method for processing a packet domain service signal, enabling a terminal that does not support an accessing control protocol of an Internet Protocol Multimedia Subsystem (IMS) to access the IMS and acquire services in the IMS.

An embodiment of the present invention provides a system for processing a packet domain service signal, including:

an Internet Protocol Multimedia Subsystem (IMS);

at least one access gateway function for implementing a function of conversion between a narrowband voice in a circuit domain and an Internet Protocol (IP) media flow in a packet domain, and a function of conversion between user interface signalling in the circuit domain and call control signalling in the packet domain; and at least one access gateway control function for implementing access management and call control for the access gateway function, and enabling the user equipment which accesses the access gateway control function through the access gateway function to access a Call Session Control Function (CSCF) in the IMS.

The system further includes a first application server for providing a function of service control of the PSTN/ISDN according to service triggering of the CSCF.

Preferably, the first application server includes means for implementing the service control of the PSTN/ISDN including control of a basic service, a supplementary service and an extended value-added service.

Preferably, the access gateway control function includes a sixth module for processing a basic service and a supplementary service of the PSTN/ISDN; and the first application server comprises means for processing an extended value-added service.

Preferably, the access gateway control function includes a seventh module for generating a charging request according to a requirement defined by a standard of the IMS, and sending the charging request to a charging collection unit in the IMS.

Preferably, the access gateway control function includes a second module for implementing registration and authentication of the access gateway function.

Preferably, the access gateway control function includes a fourth module for converting between Session Initiation Protocol (SIP) and an interface protocol of an interface through which the access gateway control function is connected to the access gateway function; and a fifth module for obtaining a user identify of a calling user according to an access gateway function identity and a user port identity, or locating an access gateway function and a user port which a called user accesses according to a user identity.

The interface adopts one of H.248 protocol, Media Gateway Control Protocol, the SIP and the IUA/V5UA over SIGTRAN protocol.

Another embodiment of the present invention provides a method for processing a packet domain service signal. When a user makes an outgoing call, the method includes:

transferring a first message to an access gateway control function upon receiving a dialling signal from a user equipment processing a service signal of a Public Switched Telephone Network (PSTN)/Integrated Services Digital Network (ISDN);

upon receiving the first message, obtaining, by the access gateway control function, a user identity according to an identity of the access gateway function and a user port identity, converting the first message to an Session Initiation Protocol (SIP) request message, and sending the SIP message to a Call Session Control Function (CSCF) in an Internet Protocol Multimedia Subsystem (IMS);

implementing, by the CSCF, service triggering according to user subscription information, and sending a second message to a first application server;

upon receiving the second message, implementing, by the first application server, service control of the PSTN/ISDN, and notifying the CSCF to continue to implement session control by a third message.

Preferably, the process of continuing to implement the session control includes:

determining whether the third message received triggers a new service;

if the third message received triggers a new service, triggering the new service and sending a new SIP request message to an application server corresponding to the new service; otherwise, implementing connection control and routing.

Preferably, the process of implementing the connection control and the routing includes determining whether a called user is in a domain of the IMS;

if the called user is in the domain of the IMS, sending an SIP request message to a Serving Call Session Control Function in a home domain of the called user;

otherwise, sending an SIP request message to a Breakout gateway control function.

Preferably, the service control of the PSTN/ISDN includes control of a basic service, a supplementary service and an extended value-added service.

Preferably, the method further includes:

before converting the first message to the SIP request message, and sending the SIP request message to the CSCF in the IMS, controlling a basic service and a supplementary service of the PSTN/ISDN; wherein the service control of the PSTN/ISDN implemented by the first application server includes control of an extended value-added service.

Preferably, the first message adopts one of H.248 protocol, Media Gateway Control Protocol, the SIP and the IUA/V5UA over SIGTRAN protocol.

Another embodiment of the present invention provides a method for processing a packet domain service signal. When a user makes an incoming call, the method includes:

upon receiving a Session Initiation Protocol (SIP) request message, triggering, by a Call Session Control Function (CSCF) in a home domain of a called user, a service according to user subscription information, and sending a fourth message to a first application server;

upon receiving the fourth message, implementing, by the first application server, service control of a Public Switched Telephone Network (PSTN)/Integrated Services Digital Network (ISDN), and sending a fifth message to the CSCF;

upon receiving the fifth message, implementing, by the CSCF, connection control and routing, and sending a Session Initiation Protocol (SIP) request message to an access gateway control function;

upon receiving the SIP request message, locating, by the access gateway control function, an access gateway function that a called user accesses and a user port according to a called user identity, converting the SIP request message to a sixth message, and notifying the access gateway function to send an incoming call signal to a user equipment processing a service signal of the PSTN/ISDN.

The processes of implementing the connection control and the routing, and sending the SIP request message to the access gateway control function include:

upon receiving the fifth message, determining whether a new service is triggered;

if the new service is triggered, triggering the new service and sending an SIP request message to an application server corresponding to the new service;

otherwise, implementing the connection control and the routing, and sending an SIP request message to the access gateway control function.

Preferably, the service control of the PSTN/ISDN implemented by the first application server includes control of a basic service, a supplementary service and an extended value-added service.

Preferably, the service control of the PSTN/ISDN implemented by the first application server includes control of an extended value-added service;

upon receiving the SIP request message, the access gateway control function determines whether a basic service and a supplementary service of the PSTN/ISDN are triggered;

if the basic service and the supplementary service are triggered, the access gateway control function controls the basic service and the supplementary service that are triggered, and determines whether to carry out the session control again for the incoming call;

if determining to carry out the session control again for the incoming call, the access gateway control function sends an SIP request message to the CSCF, and the CSCF continues to implement the session control again;

if determining not to carry out the session control again for the incoming call, the incoming call is terminated;

if the basic service and the supplementary service are not triggered, the access gateway control function locates an access gateway function that a called user accesses and a user port according to the called user identity, converts the SIP request message to the sixth message, and notifies the access gateway function to send an incoming call signal to a user equipment processing the service signal of the PSTN/ISDN.

Preferably, the sixth message adopts one of H.248 protocol, Media Gateway Control Protocol, the SIP and the IUA/V5UA over SIGTRAN protocol.

As can be seen from the above, in the embodiments of the present invention, the Access Gateway Control Function (AGCF) for shielding differences between access users is added on the basis of the IMS defined in the 3GPP R5/R6 standard; a PSTN user and an ISDN user first access an Access Gateway Function (AGF), then access the IMS through the agent function of the AGCF which is also configured for performing access management and control of the AGF. Control of the PSTN/ISDN services may be implemented in the AGCF or implemented in a dedicated Application Server (AS) added to the IMS; or the control of the basic service and the supplementary service may be implemented in the AGCF while the control of the value-added service may be implemented in the AS.

Through adopting the technical solutions, the terminal which is not supported by the IMS previously, such as a PSTN/ISDN terminal, can access the IMS, and the resources of the IMS may be used fully to provide the terminals with the services. Thus, the extended IMS becomes a general telecommunication service network allowing the access of various terminals.

EMBODIMENTS OF THE INVENTION

In an embodiment of the present invention, a new network node, that is, an AGCF, is introduced to the IMS defined in the 3GPP R5/R6 standard. Through managing an access device, a PSTN user and an ISDN user are able to access an IMS domain, and PSTN/ISDN services are provided to the PSTN user and the ISDN user. Furthermore, functions of each network node in the IMS defined in the 3GPP standard remain unchanged, and an accessing user may be regarded as a user in the IMS domain, such as a 3G mobile user because the AGCF shields differences between accessing users. The PSTN/ISDN services may be implemented by the AGCF, or be managed by a PSTN/ISDN Simulation Application Server (AS), i.e. a first application server, in the IMS in a centralized manner; or a basic service and a supplementary service are managed by the AGCF while an extended value-added service is managed by the PSTN/ISDN Simulation AS.

The network architecture and the principle of the system for processing the packet domain service signal is hereinafter described in detail with reference to FIG. 2.

In an embodiment of the present invention, the system for processing the packet domain service signal includes IMS 10, PSTN/ISDN Simulation AS 20, AGCF 30, AGF 40, Access Network (AN) 51, PSTN User Equipment (UE) 52, ISDN UE 53, and Private Branch eXchange (PBX) 54. In the embodiments of the present invention, PSTN UE 52, ISDN UE 53 and PBX 54 are uniformly referred to as UE 50.

The connection relations of sub-systems in the system for processing the packet domain service signal are described below. PSTN/ISDN Simulation AS 20 is connected with the Home Subscriber Server (HSS) in IMS 10 through the Sh interface, connected with the Subscription Locator Function (SLF) in IMS 10 through the Dh interface, and connected with the Call Session Control Function (CSCF) in IMS 10 through the IP multimedia Service Control (ISC) interface. AGCF 30 is connected with the CSCF in IMS 10 through the I1 interface, and connected with AGF 40 through the I2 interface. Furthermore, AGF 40 is connected with AN 51 through the V5 interface, connected with PSTN UE 52 through the Z interface, connected with ISDN UE 53 through the Basic Rate Interface (BRI), and connected with PBX 54 through the Foreign Exchange Office (FXO) interface/Primary Rate Interface (PRI)/E1 interface.

Functions of the sub-systems are hereinafter described in detail.

IMS 10 is an IMS defined in the 3GPP R5/R6 standard, in which network entities and related interfaces are completely the same as those defined in the 3GPP IMS standard. Refer to the published "3GPP TS 23.002" for detailed information.

Several network entities in the IMS which are relatively related to the embodiment of the present invention are hereinafter described in brief.

The CSCF is configured for implementing the session control function of the Session Initiation Protocol (SIP) of users accessing through the AGF (the PSTN user and the ISDN user accessing through AGF 40).

The HSS is configured for providing the storing and managing function of the user subscription data of the users accessing through the AGF, and the storing and managing function of the PSTN/ISDN service related data of the users accessing through the AGF.

The SLF is configured for providing the subscription locating function of the users accessing through the AGF.

Although the network entities above serve the users accessing through the AGF, those skilled in the art may appreciate that no modification to the network entities is needed in fact, and the users accessing through the AGF may be regarded and processed as common users in the IMS domain (e.g. the 3G mobile users) because AGCF 30 shields differences between the users accessing the IMS.

PSTN/ISDN Simulation AS 20 is configured for providing the PSTN/ISDN service control for the users accessing through the AGF. An AS is a standard network entity in the IMS, and the difference between PSTN/ISDN Simulation AS 20 and the other AS is that PSTN/ISDN Simulation AS 20 is dedicated to providing the PSTN/ISDN service control while the other AS in the IMS may not provide the PSTN/ISDN service control. The interfaces between PSTN/ISDN Simulation AS 20 and each network entity in IMS 10 are standard interfaces.

PSTN/ISDN Simulation AS 20 may be applied in two methods.

In an embodiment of the present invention, PSTN/ISDN Simulation AS 20 provides all the PSTN/ISDN service control. The advantage of this method is that call control is completely separated from service control, and the PSTN/ISDN services function as a network service ability provided by the AS in the IMS. In this method, all the user subscription data and service related data of the users are stored in the HSS in IMS 10.

In another embodiment of the present invention, AGCF 30 implements the control of the basic service and the supplementary service while PSTN/ISDN Simulation AS 20 implements the control of the extended value-added service. The advantage of this method is that, compared with the former method, the PSTN/ISDN services may be implemented faster. The SIP was not designed to implement the PSTN/ISDN services initially, in order to implement the basic service and supplementary service by PSTN/ISDN Simulation AS 20, AGCF 30 needs to implement mapping between part of the user interface signalling and the SIP or to encapsulate part of the user interface signalling into the SIP, and the usage of the SIP may further be extended, such as mapping a hooking event (the key of R is pressed) in the user interface signalling, mapping the dialling scheme including *# type using the KPML, mapping the dialling scheme of a second dialling tone by the KPML, mapping the pulse charging event and antipolar charging event using the message of SIP from the PSTN/ISDN Simulation AS. In the latter method, the subscription data and service data related to the basic services and supplementary services of the PSTN/ISDN are stored in AGCF 30, other subscription data and service data are stored in the HSS in IMS 10. In this method, unless an outgoing call of the user is terminated by AGCF 30 owing to the service control, all the calls of the user still have to pass IMS 10 in which the S-CSCF implements connection control and routing.

In actual applications, the latter method may be applied as a transition method before existing networks can implement the service control according to the former method.

AGCF 30, as a key device of the embodiments of the present invention, is a network entity newly added for providing the access control function of AGF 40 and shielding the differences between the users accessing through the AGF and common users in the IMS domain, which may meet the demand that the session control function and the service control function in the IMS core network be independent of the accessing users. AGCF 30 may be regarded as another kind of node of a visited domain in the IMS 10, providing an access agent function to the users accessing through AGF 30.

AGCF 30 includes a first module for implementing access management and control function of AGF 40.

Signalling protocols in the I2 interface between AGCF 30 and AGF 40 may include but are not limited to the H.248 protocol, the Media Gateway Control Protocol (MGCP), the SIP, the ISDN Q.921 User Adaptation Layer/V5.2-User Adaptation Layer over Signaling Transport (IUA/V5UA over SIGTRAN) protocol.

Figure 2:
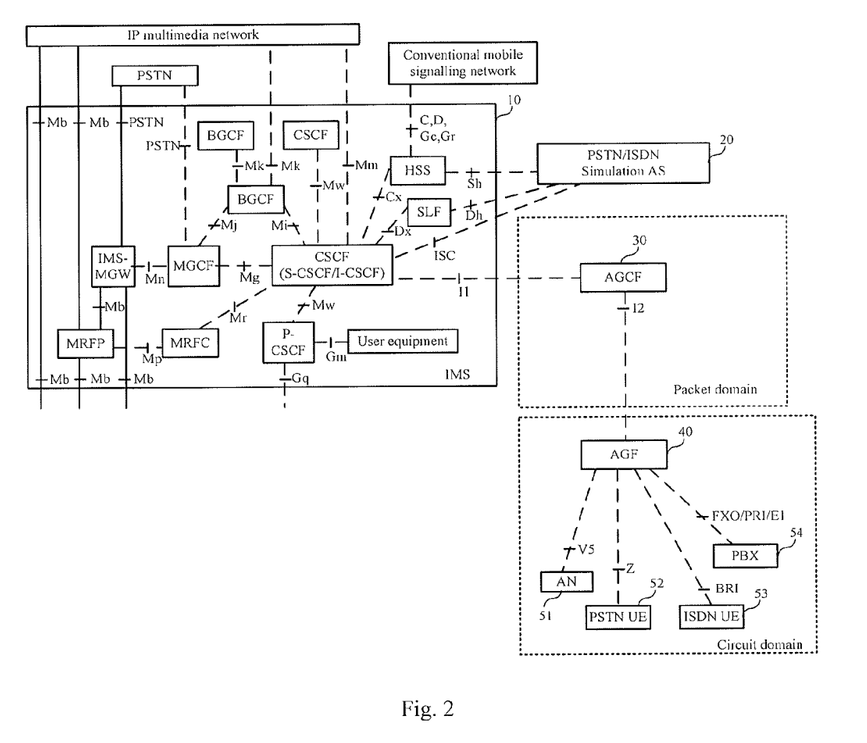
FIG. 2 shows a schematic diagram illustrating the network architecture of a system for processing a packet domain service signal in accordance with an embodiment of the present invention.

AGCF 30 may manage and control one or more AGFs 40 and only one AGF 40 is shown in FIG. 2 for the convenience of description. Each of AGFs 40 has a unique ID in AGCF 30. Those skilled in the art may appreciate that the access management and control function of AGF 40 by AGCF 30 may be implemented with reference to the management and control function of the Media Gateway (MG) by the Media Gateway Controller (MGC) in the related art.

AGCF 30 may include a second module for implementing the registration/authentication of AGF 40, as well as the function of mapping bi-directionally between the registration/authentication of AGF 40 and the registration/authentication process defined in the IMS domain. Those skilled in the art may appreciate that such registration/authentication mechanism may be implemented with reference to the registration/authentication mechanism of a user signalling layer of the terminal by the Proxy-CSCF (P-CSCF).

AGCF 30 may include a third module for implementing access agent function for the PSTN user and the ISDN user.

AGCF 30 in the visited location provides the access agent function for the PSTN user and the ISDN user that access through AGF 40, and shields the access differences between the PSTN user and the ISDN user, which meets the demand that the session control function and the service control function of the IMS core network are independent of the accessing users. Therefore, no modification to the functions of the network nodes in the IMS defined by the 3GPP standard is needed.

The interface between AGCF 30 and the S-CSCF or the I-CSCF in IMS 10 is the I1 interface, the reference point of which is based on the SIP. The reference point of I1 interface may be based on the SIP-I in some cases, e.g. when information of the ISDN supplementary service needs to be carried.

AGCF 30 may include a fourth module for implementing mapping between the signalling processes of an I2 interface protocol and an I1 interface protocol. In the case that the signalling protocol of the I2 interface is the SIP, AGCF 30 need not perform the mapping between the I2 interface protocol and the I1 interface protocol, but certain modification to contents of the I2 interface protocol or the I1 interface protocol may be needed.

AGCF 30 may make the identities of the PSTN user and ISDN user correspond to the S-CSCF according to a mode of data configuration, thus obtaining the address of the home S-CSCF of the PSTN user and ISDN user.

AGCF 30 may obtain the address of the I-CSCF according to the mode of data configuration, and the I-CSCF chooses an S-CSCF as the home S-CSCF of the PSTN user and ISDN user.

AGCF 30 should configure a Private User Identity and a Public User Identity which are needed for accessing the IMS domain for the PSTN user and the ISDN user accessing through AGF 40.

AGCF 30 may include a fifth module. When an outgoing call from a user accessing through AGF 40 reaches AGCF 30, the fifth module may acquire the Private User Identity and the Public User Identity corresponding to the user according to, but not limited to, an identity of AGF 40 and an identity of a user port. When an incoming call to a user accessing through AGF 40 reaches AGCF 30, the fifth module may locate, according to, but not limited to, the Private User Identity and the Public User Identity of the called user, the user port of the user and AGF 40 through which the user accesses the IMS.

The second module of AGCF 30 implements the registration/authentication of the PSTN user and the ISDN user accessing through AGF 40, and maps the registration/authentication with the process of registration/authentication defined in the IMS domain.

AGCF 30 also provides the QoS control based on each session and the Network Address Translation (NAT) control mechanism, which are similar to those of the P-CSCF.

AGCF 30 may include a sixth module for implementing control of the basic service and the supplementary service of the PSTN/ISDN. The sixth module of AGCF 30 can also provide the control of the basic service and the supplementary service of the PSTN/ISDN for the PSTN user and the ISDN user accessing through AGF 40, and the service related data needed by the control are stored in AGCF 30.

AGCF 30 may include a seventh module for charging.

During the calling processes of the PSTN user and the ISDN user accessing through AGF 40, the seventh module of AGCF 30 may generate a charging request according to the requirement defined in the IMS standard and send charging information to the Charging Collection Function (CCF) in IMS 10.

AGF 40 is an access device located between a circuit domain and a packet domain, providing an access function enabling the PSTN user and the ISDN user to access the AGCF 30, and implementing the conversion function between a narrowband voice in the circuit domain and an IP media flow in the packet domain.

At the same time, AGF 40 implements the conversion function between the user interface signalling in the circuit domain and the call control signalling in the packet domain, and the call control signalling in the packet domain is transferred by the I2 interface between AGF 40 and AGCF 30. The signalling protocols over the I2 interface may include but are not limited to the H.248 protocol, the MGCP protocol, the SIP, and the IUA/V5UA over SIGTRAN protocol.

AGF 40 may be, but not limited to, an access device of AG, or an access device of IAD.

AN 51 is an access network, connected with AGF 40 through a V5 interface. A user in the access network may be a PSTN user and an ISDN user. The V5 interface provides V5 digital access signalling.

PSTN UE 52 is a PSTN terminal, connected with AGF 40 through a Z interface which provides analog user signalling.

ISDN UE 53 is an ISDN terminal, connected with AGF 40 through a BRI interface which provides ISDN digital user signalling.

PBX 54 is a Private Branch eXchange, connected with AGF 40 through an FXO interface, a PRI interface, an E1 interface or the like. A PBX 54 user may be a PSTN user or an ISDN user. The FXO interface provides the loop trunk signalling, the PRI interface provides the ISDN digital user signalling, and the E1 interface provides the digital trunk signalling. Those skilled in the art may appreciate that AN 51, PSTN UE 52, ISDN UE 53 and PBX 54 are devices in the related art, and are applied in the embodiments of the present invention without improvement of the devices.

To sum up, compare FIG. 1 with FIG. 2, it can be seen that AGCF 30 is added in the embodiments of the present invention, and the PSTN user or the ISDN user using AN 51, PSTN UE 52, ISDN UE 53 or PBX 54 is able to access the IMS through AGCF 30 and AGF 40 managed by AGCF 30. In addition, PSTN/ISDN Simulation AS 20 managing the PSTN/ISDN services is also added. The PSTN/ISDN services are implemented using the architecture shown in FIG. 2 in the embodiments of the present invention.

It should be noted that the core of the method for the processing packet domain service signal in accordance with the embodiments of the present invention is the port/identity conversion and protocol conversion which are implemented by AGCF 30, and there may be multiple implementing manners for the method according to specific conditions (for example, it is needed to make full use of existing devices in some cases). The detailed process of the method for processing the packet domain service signal in accordance with two embodiments of the present invention is hereinafter described.

In an embodiment, PSTN/ISDN Simulation AS 20 provides control of all the services, including the basic service, the supplementary service and the extended value-added service of the PSTN/ISDN, for the PSTN user and the ISDN user accessing through AGF 40.

Figure 3:
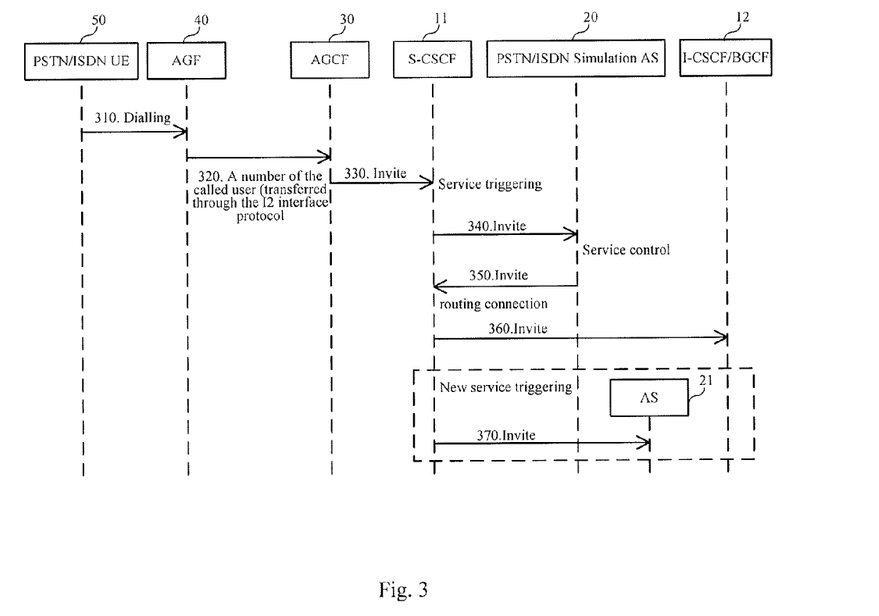
FIG. 3 shows a schematic flowchart of an outgoing call from a user accessing through an AGF in the method for processing a packet domain service signal in accordance with an embodiment of the present invention.

The calling process of an outgoing call from a user accessing through the AGF is shown in FIG. 3.

In Step 310, the user hooks off and dials through PSTN/ISDN UE 50. For the convenience of description, PSTN/ISDN UE 50 represents various user equipments of the PSTN/ISDN services, including all the related user equipments of AN 51, PSTN UE 52, ISDN UE 53 and PBX 54.

In Step 320, AGF 40 sends the called number to AGCF 30 through the I2 interface protocol upon receiving the dialling signal from PSTN/ISDN UE 50.

In Step 330, AGCF 30 acquires the Private User Identity and the Public User Identity corresponding to the user according to the identity of AGF 40 and the identity of the user port, maps the I2 interface protocol to the SIP, and sends an INVITE message to S-CSCF 11. Those skilled in the art may appreciate that the INVITE message is an SIP request message defined in the SIP. S-CSCF 11 is a network entity in IMS 10.

In Step 340, S-CSCF 11 triggers the service according to the user subscription information and sends the INVITE message to PSTN/ISDN Simulation AS 20. The user subscription information may be acquired from the HSS in IMS 10.

In Step 350, PSTN/ISDN Simulation AS 20 sends the INVITE message to S-CSCF 11 upon performing corresponding control of the PSTN/ISDN services.

In Step 360, S-CSCF 11 keeps the session control and determines whether to trigger a new service subsequently or to implement the connection control and the routing. If S-CSCF 11 determines according to the user subscription data that a new service needs to be triggered in another AS, perform Step 370; otherwise, S-CSCF 11 implements the connection control and the routing, specifically, sends the INVITE message to the I-CSCF of the home domain of the called user if the called user is in the IMS domain, for example, the called user is also a user accessing through AGF 40, and sends the INVITE message to the Breakout Gateway Control Function (BGCF) if the called user is outside the IMS domain.

In Step 370, when S-CSCF 11 determines according to the user subscription data that a new service needs to be triggered in another AS, S-CSCF 11 triggers the new service and sends an INVITE message to AS 21 corresponding to the new service.

Figure 4:
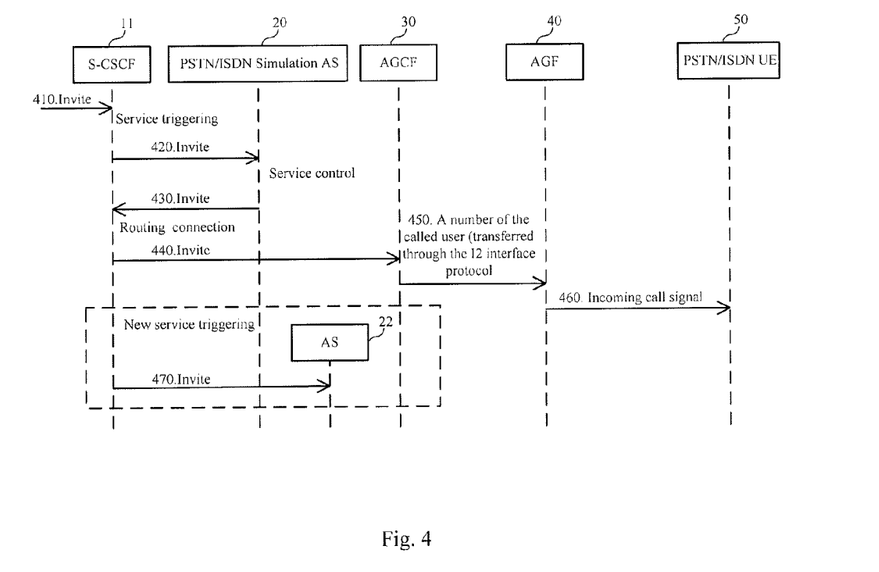
FIG. 4 shows a schematic flowchart of an incoming call to a user accessing through an AGF in the method for processing a packet domain service signal in accordance with an embodiment of the present invention.

The calling process of an incoming call to a user accessing through the AGF is shown in FIG. 4.

In Step 410, S-CSCF 11 in the home domain of the called user triggers the service according to the user subscription information upon receiving the INVITE message. The user subscription information may be acquired from the HSS in IMS 10.

In Step 420, S-CSCF 11 sends the INVITE message to PSTN/ISDN Simulation AS 20.

In Step 430, PSTN/ISDN Simulation AS 20 sends the INVITE message to S-CSCF 11 upon performing appropriate service control.

In Step 440, S-CSCF keeps the session control and determines whether to trigger a new service subsequently or to implement the connection control and the routing. If S-CSCF 11 determines according to the user subscription data that a new service needs to be triggered in another AS, perform Step 470; otherwise, S-CSCF 11 implements the connection control and the routing, specifically, sends the INVITE message to AGCF 30 and performs Step 450 if the called user is a user accessing through AGF 40.

In Step 450, AGCF 30 locate AGF 40 accessed by the user and the user port according to the Public User Identity of the called user and the information stored when the user registers, maps the SIP to the I2 interface protocol, and transfers the called number to AGF 40 through the I2 interface protocol.

In Step 460, AGF 40 sends an incoming call signal to PSTN/ISDN UE 50.

In Step 470, S-CSCF 11 triggers a new service and sends the INVITE message to AS 22 corresponding to the new service.

In an embodiment, AGCF 30 provides the control of the basic service and the supplementary service for a user accessing through AGF 40 while PSTN/ISDN Simulation AS 20 provides the control of the extended value-added service.

Figure 5:
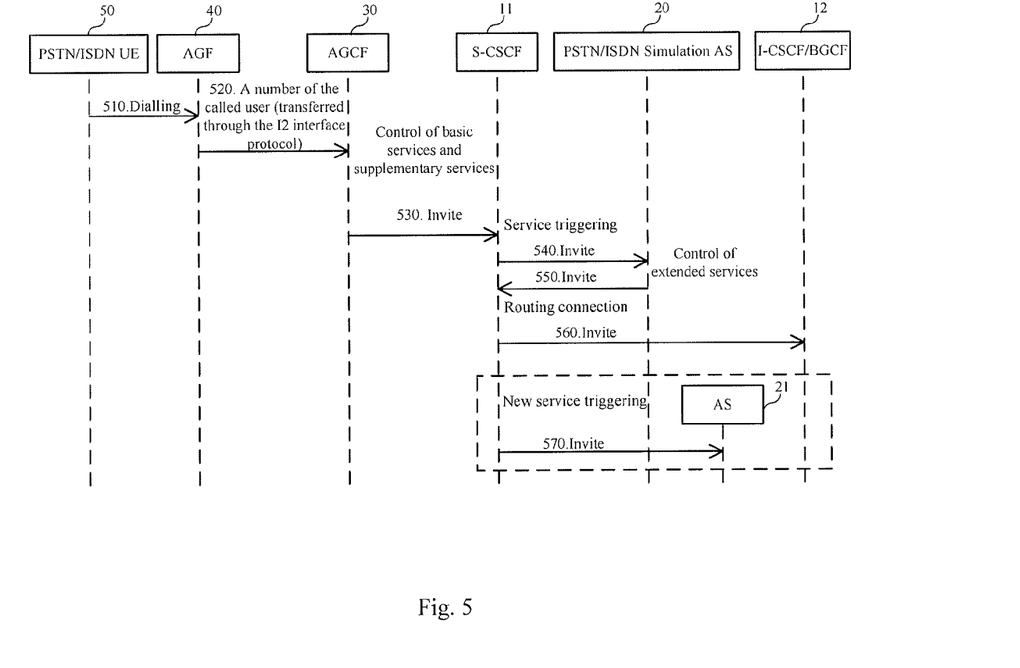
FIG. 5 shows a schematic flowchart of an outgoing call from a user accessing through an AGF in the method for processing a packet domain service signal in accordance with another embodiment of the present invention.

The calling process of an outgoing call from a user accessing through AGF 40 is shown in FIG. 5.

In Step 510, the user hooks off and dials through PSTN/ISDN UE 50.

In Step 520, AGF 40 sends the called number to AGCF 30 through the I2 interface protocol upon receiving the dialling signal from PSTN/ISDN UE 50.

In Step 530, AGCF 30 controls the basic service and supplementary service of the PSTN/ISDN first. The basic service and the supplementary service of the PSTN/ISDN mentioned herein include such services as abbreviated dialling and registration of a new service. When the processing of the services is completed, AGCF 30 terminates the call if the call ends accordingly, for example, in the case that AGCF 30 processes the registration of a new service; if the call continues, for example, in the case that AGCF 30 processes an abbreviated dialling service, AGCF 30 acquires the Private User Identity and the Public User Identity corresponding to the user according to the identity of AGF 40 and the identity of the user port, maps the I2 interface protocol to the SIP, and sends an INVITE message to S-CSCF 11. It should be noted that the user subscription information and service data related to the basic service and the supplementary service of the PSTN/ISDN are stored in AGCF 30, or stored in the HSS and downloaded to AGCF 30 when AGCF 30 starts up or when the user registers; other user subscription information and service data are stored in the HSS in IMS 10.

In Step 540, S-CSCF 11 triggers the service according to the user subscription information and sends the INVITE message to PSTN/ISDN Simulation AS 20.

In Step 550, PSTN/ISDN Simulation AS 20 sends the INVITE message to S-CSCF 11 upon performing the corresponding control of the value-added service of the PSTN/ISDN.

In Step 560, S-CSCF 11 keeps controlling the session and determines to trigger a new service or to implement the connection control and the routing subsequently. If S-CSCF 11 determines according to the user subscription data that a new service needs to be triggered in another AS, perform Step 570; otherwise, S-CSCF 11 implements the connection control and the routing, specifically, sends the INVITE message to the I-CSCF of the home domain of the called user if the called user is in the IMS domain, e.g., the caller user is also a user accessing through AGF 40; sends the INVITE message to the BGCF if the called user is outside the IMS domain.

In Step 570, when S-CSCF 11 determines according to the user subscription data that a new service needs to be triggered in another AS, S-CSCF 11 triggers the new service and sends the INVITE message to AS 21 corresponding to the new service.

Figure 6:
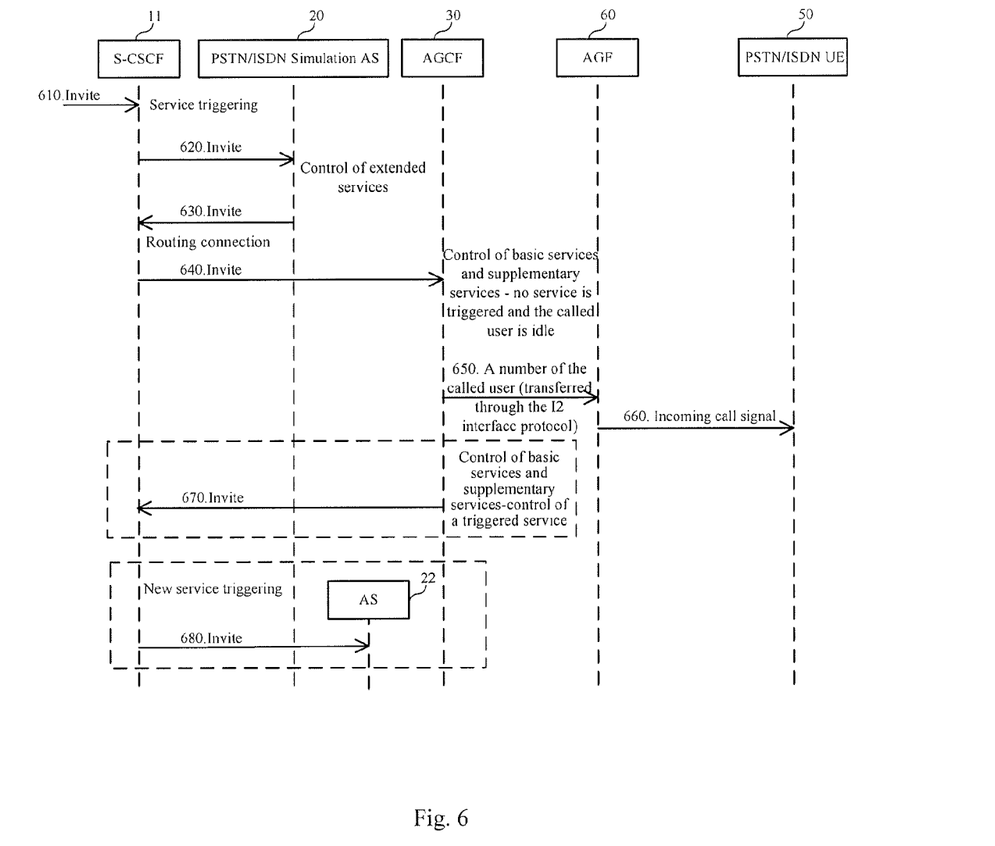
FIG. 6 shows a schematic flowchart of an incoming call to a user accessing through an AGF in the method for processing a packet domain service signal in accordance with another embodiment of the present invention.

The calling process of an incoming call to a user accessing through the AGF is shown in FIG. 6.

In Step 610, the S-CSCF 11 of the home domain of the called user triggers a service according to the user subscription information upon receiving an INVITE message.

In Step 620, S-CSCF 11 sends the INVITE message to PSTN/ISDN Simulation AS 20.

In Step 630, PSTN/ISDN Simulation AS 20 sends the INVITE message to S-CSCF 11 upon implementing the corresponding control of the value-added services.

In Step 640, S-CSCF 11 keeps controlling the session and determines to trigger a subsequent new service or to implement the connection control and the routing. If S-CSCF 11 determines according to the user subscription data that a service needs to be triggered in another AS, perform Step 680; otherwise, S-CSCF 11 implements the connection control and the routing, specifically, sends the INVITE message to AGCF 30 when the called user is a user accessing through the AGF, then perform Step 650.

In Step 650, AGCF 30 determines whether one of the basic services and the supplementary services of the PSTN/ISDN has been triggered. If yes, perform Step 670. If no, that is, if the called user is idle, AGCF 30 locates both the AGF accessed by the user and the user port according to such information as the Public User Identity and the Private User Identity of the called user, maps the SIP to the I2 interface protocol, and transfers the called number to AGF 40 through the I2 interface protocol; then perform Step 660.

In Step 660, AGF 40 sends the incoming call signal to PSTN/ISDN UE 50.

In Step 670, because AGCF 30 has triggered the service, AGCF 30 performs the corresponding control of the PSTN/ISDN service, and when the control is finished, determines whether the call requires S-CSCF 11 to perform session control again. For example, when AGCF 30 completes the call forwarding service of the called user and sends the INVITE message to S-CSCF 11, S-CSCF 11 continues with the session control. When the call ends accordingly, AGCF 30 terminates this call, for example, terminates this call if AGCF 30 finishes processing a Don't Disturb Service. If the called user is called sequentially, for example, when AGCF 30 completes processing the queuing service and the called user is idle, AGCF 30 locates both AGF 40 accessed by the user and the user port according to the Public User Identity of the called user and the information recorded when the user registers, maps the SIP to the I2 interface protocol, and transfers the called number to AGF 40 through the I2 interface protocol. Then perform Step 660.

In Step 680, S-CSCF 11 triggers a new service and sends an INVITE message to AS 22 corresponding to the new service.

As can be seen from the embodiments above, new application services may be customized quickly for PSTN/ISDN users. The PSTN/ISDN services, as a network service ability of the IMS, can participate in fast combination of services or customization of new application services. All the services in the IMS are combination of multiple ASs, and each AS provides a basic network service ability or a specific value-added service, and all the ASs can perform combination of new application services by a service subscription rule as network sharing components; all the ASs can also be open through a third party application interface, by which new application services may be customized by a third party.

Seamless integration of the fixed network architecture and service with the mobile network architecture and service is achieved. Specifically, in the embodiments of the present invention, each of the network nodes defined in the 3GPP IMS standard need not be changed, and the existing IMS is used as the IMS defined by the mobile network, only adding a new network node, i.e. the AGCF, which enables a PSTN user and an ISDN user to access the IMS domain through the AGF, achieving the seamless integration of the fixed network with the mobile network. With the shielding function of the AGCF, the IMS need not distinguish the manner in which the user accesses the terminal, that is, the services provided by the IMS are the services independent of the networks, and a PSTN/ISDN Simulation AS can also provide service control to mobile users; the ASs customized for the mobile users can also serve the fixed users in the same way if the fixed terminals have the abilities, achieving the seamless integration of the fixed network with the mobile network in service provision.

Bran-new services may be provided to the PSTN user and the ISDN user. The IMS serves as a system providing IP multimedia services, and PSTN/ISDN Simulation AS can provide multiple value-added services and combine such services with other service abilities of the IMS network so as to provide bran-new services to an accessing PSTN user and ISDN user. With the cooperation of terminals, such as a Web Client, the services, such as network directory, instant message, Presence service, unified message service, click dialling, click transfer, click queue, click convention, intelligent routing, customized ring back tone, calling user coloured image, task customization and prompt, and self-help management. Especially, with the ubiquitous click control, service customization and self-help management, it is more convenient to use the PSTN/ISDN services, the Average Revenue Per Unit (ARPU) of a fixed network user may increase and new service grow points may be found.

The access via a Private Branch eXchange (PBX) is supported, which facilitates construction of a cross-domain enterprise network. A PBX user may enjoy the same services as other users accessing through the AGF. The cross-domain enterprise network can be constructed between multiple PBXs and the PBX users may enjoy a wide area IP Centrex service. Because such functions are the existing functions in the IMS, the access of the terminal to the IMS allows convenient provision of the functions for the terminal accessing newly.

Besides the advantages above, such as achieving seamless integration of the fixed network with the mobile network in terms of the IMS, because the improvement on the basis of the IMS, the technical solutions also have the following characteristics.

The implementation of services is independent of the network, thus deploying and extending the services quickly and achieving a low cost of customizing the services. In the embodiments of the present invention, the PSTN/ISDN services are all implemented by the PSTN/ISDN Simulation AS, or part of the services are implemented by the PSTN/ISDN Simulation AS and others are implemented by the AGCF. Specifically, the S-CSCF provides the session control function independent of all the services, and the session control function and the service control function are implemented by different network nodes. The newly added network node, i.e. the AGCF, shields difference between a PSTN user and an ISDN user accessing through the AGF, and a unified session control interface of the SIP is provided to the IMS.

Conflicts between multiple services are effectively avoided, and problems, such as multiple triggering of a service, providing a service by multiple points, nesting dialling of a service, are resolved. All the services in the IMS are triggered by the S-CSCF through the user service subscription data, and conflicts between triggering of the PSTN/ISDN services and triggering of other services, such as the intelligent service, may be effectively avoided by setting an appropriate trigger rule. The PSTN/ISDN services are uniformly implemented by one network node, that is, the AS, and the AS can coordinate various PSTN/ISDN services properly and arbitrate when the conflicts between services occur.

The user subscription data are uniformly managed by the HSS and all the services of the users are uniformly provided by the AS in a centralized manner, which makes it convenient for the operator to promote services of a unified brand.

The nomadism characteristic and service mobility of the fixed network user are supported. Because the user subscription data are collected and managed in the HSS of the IMS and the terminal port of a user at the access point is separated from the public ID of the user, the nomadism characteristic of the fixed network user is supported. The user always acquires the services in the home domain to which the user has subscribed, and the user may always be routed through different access points to the home domain to which the user has subscribed when the terminal moves. Thereby, the services acquired are completely the same as the previous services.

The wide area service is implemented easily, and plenty of cross-domain IP Centrex services may attract more enterprise clients. Because all the user data of the PSTN/ISDN services are collected and managed in HSSs in the IMS and the location between the multiple HSSs may be determined using the SLF in the IMS, thus the wide area service may be implemented easily.

The enterprise services and group services may be customized quickly and conveniently. In the IMS, the PSTN/ISDN Simulation AS may exist as multiple physical entities, and a separate AS of the enterprise services and group services may be customized for the users with a special demand. Thereby, customized services with individualized characteristics may be provided quickly and conveniently without impact on other services and users.

Though the present invention has been illustrated and described by referring to some preferred embodiments of the present invention, those skilled in the art should understand that various changes can be made in its form and detail without departing from the spirit or scope of the present invention described in the appended claims.

What is claimed is:

1. A method for processing a packet domain service signal, when a user makes an incoming call, the method comprising:
   upon receiving a Session Initiation Protocol (SIP) request message, triggering, by a Call Session Control Function (CSCF) in a home domain of a called user, a service according to user subscription information, and sending a first message to a first application server;
   upon receiving the first message, implementing, by the first application server, service control of a Public Switched Telephone Network (PSTN)/Integrated Services Digital Network (ISDN), and sending a second message to the CSCF;
   upon receiving the second message, implementing, by the CSCF, connection control and routing, and sending a Session Initiation Protocol (SIP) request message to an access gateway control function;
   upon receiving the SIP request message, locating, by the access gateway control function, an access gateway function that a called user accesses and a user port according to a called user identity, converting the SIP request message to a third message, and notifying the access gateway function to send an incoming call signal to a user equipment processing a service signal of the PSTN/ISDN;
   wherein the service control of the PSTN/ISDN implemented by the first application server comprises control of an extended value-added service;
   wherein, upon receiving the SIP request message, the access gateway control function determines whether a basic service and a supplementary service of the PSTN/ISDN are triggered;
   wherein, if the basic service and the supplementary service are triggered, the access gateway control function controls the basic service and the supplementary service that are triggered, and determines whether to carry out the session control again for the incoming call;
   wherein, if determining to carry out the session control again for the incoming call, the access gateway control function sends an SIP request message to the CSCF, and the CSCF continues to implement the session control again;
   wherein, if determining not to carry out the session control again for the incoming call, the incoming call is terminated; and
   wherein, if the basic service and the supplementary service are not triggered, the access gateway control function locates an access gateway function that a called user accesses and a user port according to the called user identity, converts the SIP request message to the third message, and notifies the access gateway function to send an incoming call signal to a user equipment processing the service signal of the PSTN/ISDN.

* * * * *